(12) United States Patent
Kossakovski et al.

(10) Patent No.: US 7,400,796 B1
(45) Date of Patent: Jul. 15, 2008

(54) WHISPERING-GALLERY-MODE RESONATOR ARCHITECTURES AND MANUFACTURING PROCESSES

(75) Inventors: Dmitri A Kossakovski, S. Pasadena, CA (US); Vladimir Ilchenko, Arcadia, CA (US)

(73) Assignee: OEwaves, Inc., Pasadena, CA (US)

( * ) Notice: Subject to any disclaimer, the term of this patent is extended or adjusted under 35 U.S.C. 154(b) by 213 days.

(21) Appl. No.: 10/887,338

(22) Filed: Jul. 8, 2004

Related U.S. Application Data

(60) Provisional application No. 60/496,064, filed on Aug. 18, 2003, provisional application No. 60/485,605, filed on Jul. 8, 2003.

(51) Int. Cl.
*G02B 6/26* (2006.01)
*G02B 6/42* (2006.01)

(52) U.S. Cl. .................. 385/32; 385/123; 385/30

(58) Field of Classification Search ............ 385/32, 385/30
See application file for complete search history.

(56) References Cited

U.S. PATENT DOCUMENTS

| | | | | |
|---|---|---|---|---|
| 4,410,827 A | * | 10/1983 | Kogure | 310/370 |
| 4,625,317 A | * | 11/1986 | Kolb et al. | 372/88 |
| 4,985,655 A | * | 1/1991 | Jensik et al. | 310/344 |
| 5,407,119 A | * | 4/1995 | Churchill et al. | 228/124.5 |
| 5,854,806 A | * | 12/1998 | Sutter | 372/82 |
| 6,389,197 B1 | * | 5/2002 | Iltchenko et al. | 385/28 |
| 6,488,861 B2 | * | 12/2002 | Iltchenko et al. | 216/24 |
| 6,490,039 B2 | * | 12/2002 | Maleki et al. | 356/436 |
| 6,865,314 B1 | * | 3/2005 | Blair et al. | 385/27 |
| 7,031,365 B2 | * | 4/2006 | Kneissl et al. | 372/94 |
| 2002/0018611 A1 | * | 2/2002 | Maleki et al. | 385/15 |
| 2003/0012504 A1 | * | 1/2003 | Iltchenko | 385/39 |
| 2004/0218654 A1 | * | 11/2004 | Kneissl et al. | 372/94 |
| 2005/0135453 A1 | * | 6/2005 | Kneissl et al. | 372/94 |

* cited by examiner

*Primary Examiner*—Kianni C Kaveh
(74) *Attorney, Agent, or Firm*—Fish & Richardson P.C.

(57) ABSTRACT

This application describes optical resonators having deposited optical material layers and optical resonators having layered structures to support whispering gallery modes.

20 Claims, 6 Drawing Sheets

FIG. 10

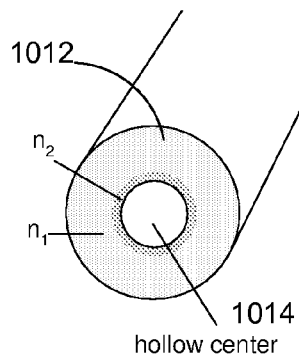

Step 1. A preform tube is fabricated by standard fiber preform fabrication techniques. A layer of high purity doped material is deposited inside the high purity fused silica tube. The inside layer has higher refractive index then that of the outside tube, similar to fiber fabrication. Layer thickness and index of refraction are the design parameters.

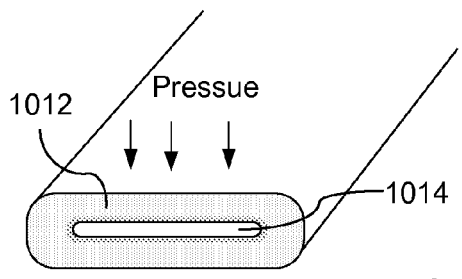

Step 2. The tube is collapsed with pressure applied from two opposing direction to form a flat piece with eventual elimination of hollow center channel.

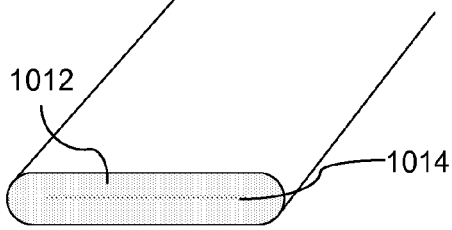

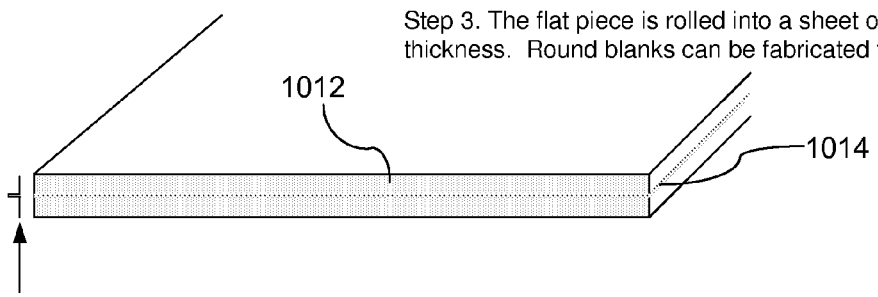

Step 3. The flat piece is rolled into a sheet of desired thickness. Round blanks can be fabricated from such a sheet.

Profile of the reflective index in the cross-section of the material

WHISPERING-GALLERY-MODE RESONATOR ARCHITECTURES AND MANUFACTURING PROCESSES

This application claims the benefits of U.S. Provisional Patent Application Nos. 60/485,605 entitled "Process to form a whispering gallery mode resonator by gas/vapor phase material deposition" and filed Jul. 8, 2003, and 60/496,064 entitled "Novel whispering gallery mode resonator architectures and manufacturing processes" and filed Aug. 18, 2003. The entire disclosures of the above applications are incorporated herein by reference as part of the specification of this application.

The research and development for inventions described in this application received funding under BAA Contract No. DAAD17-02-C-0085 from ARL. The U.S. Government may have certain rights to various technical features described in this application.

BACKGROUND

This application relates to optical resonators such as optical whispering-gallery-mode ("WGM") resonators and their fabrication.

An optical whispering-gallery-mode ("WGM") resonator is specially shaped to support whispering gallery ("WG") modes. These resonator modes represent optical fields confined in an interior region close to the surface of the resonator due to the total internal reflection at the boundary. Microspheres with diameters from few tens of microns to several hundreds of microns have been used to form compact optical WGM resonators. Such spherical resonators include at least a portion of the sphere that comprises the sphere's equator. The resonator dimension is generally much larger than the wavelength of light so that the optical loss due to the finite curvature of the resonators is small. As a result, a high quality factor, Q, may be achieved in such resonators. Some microspheres with sub-millimeter dimensions have been demonstrated to exhibit high quality factors for light waves, ranging from $10^3$ to $10^9$ for quartz microspheres. Hence, optical energy, once coupled into a whispering gallery mode, can circulate within the WGM resonator with a long photon life time. The capability of producing high Q values makes the WGM resonators useful for many optical applications, including optical filtering, optical modulation, optical delay, optical sensing, compact lasers, and opto-electronic oscillators.

SUMMARY

This application describes, among others, WGM resonator designs and fabrication methods. For example, A method for making an optical resonator is described. First, a first material is shaped to define a shape of an optical resonator. Next, a layer of a second material is deposited on the shaped first material to conform to a portion of the first material. The deposited layer of the second material forms the resonator. The shaped first material may be in a geometry to support WG modes and the deposited layer may be an optical material that is sufficiently thick to support the WG modes. An example of devices based on the above method is described to include a substrate material shaped to define a shape of an optical resonator which supports at least one whispering gallery mode, and a layer of a glass material deposited on the substrate material by a vapor deposition process to form the resonator.

This application also describes composite WGM resonators. An example of such resonators includes a thin disk of a first optical material having a curved edge to support at least one whispering gallery mode, and a thick top cladding layer and a thick bottom cladding layer respectively formed on top and bottom surfaces of the think disk. The cladding layers have curved edges which form a continuous contour with the curved edge of the thin disk and are made from a second optical material which has a refractive index less than the thin disk. The thin disk and the thick top and bottom cladding layers form a whispering gallery mode resonator.

Furthermore, this application describes whispering gallery mode optical resonators with the optical part for supporting the WG modes covered by a different material. In one implementation, a resonator is described to include an outer tube of a first material with a first refractive index and shaped to have a first circular bulging belt region, and an inner tube of a second material with a second refractive index higher than the first refractive index and conformingly engaged to the inner side of the outer tube to have a second circular bulging belt region conformingly engaged to the inner side of the first circular bulging belt region and configured to support whispering gallery modes. The end openings of the tubes may be sealed to completely isolate the inner tube from exposing to the environment.

These and other devices, methods and associated advantages are described in greater details in the attached drawings, the detailed description, and the claims.

BRIEF DESCRIPTION OF DRAWINGS

FIG. 10 shows an exemplary method for fabricating a composite WGM resonator shown in FIG. 9.

DETAILED DESCRIPTION

Figure 1:
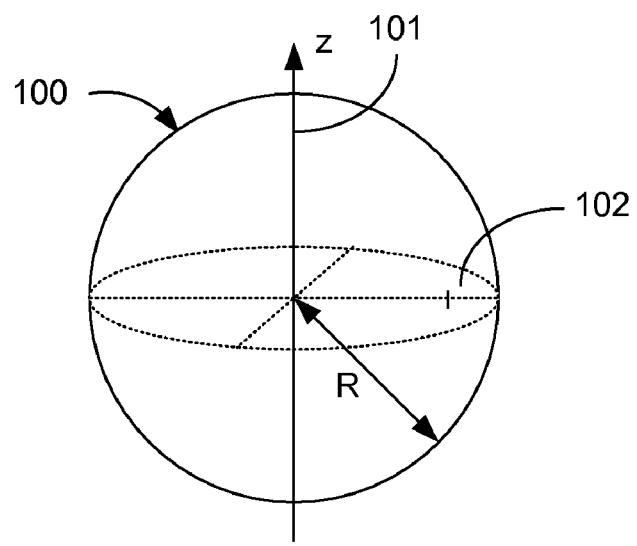
FIGS. 1, 2, 3, 4A and 4B show examples of WGM resonators.

Optical WGM resonators confine WG modes in an interior region of the resonators and the WG modes are in the optical material used to form the resonators. Hence, it is desirable that the optical material be pure and substantially free of any contaminants that absorb or scatter light in order to maintain a high quality factor. In addition, the WG modes are located close to the surface of a WGM resonator and the evanescent fields of the WG modes extend outside the exterior surface. Therefore, the surface of the resonator, especially at or near the region where the WG modes are located, should be highly smooth to be substantially free of any surface roughness and defects to reduce optical loss caused by scattering at the surface.

WGM resonators may be fabricated by first shaping an optical material into the desired resonator geometry and then polishing the surface of the shaped material. For example, a glass material can be heated to a molten state and then shaped into a desired WGM resonator shape. Next, the shaped glass piece is polished to form the final WGM resonator. In this process, the purity of the glass material depends on a supply source for the glass material and may vary from one supply source to another. The shape of the material under heat may also vary and thus different resonators shaped by the same heating process may differ in size and shape. In addition, the polishing may not remove fine surface roughness and defects so that the surface quality may cause noticeable degradation on the quality factor of the finished resonator. Furthermore, the heating process may use a hydrogen flame and the polishing may use water-based polishing slurries. Such heating and polishing processes can introduce water and other contaminations with the OH-content to cause optical absorption in the IR wavelengths such as wavelengths around 1.3 microns 1.55 microns for optical communications and other applications.

In recognition of the above and other technical issues in conventional fabrication of WGM resonators from glass and other optical materials, this application describes WGM resonators which include a support substrate that is shaped to define the geometry of a desired WGM resonator, and a layer of an optical material conformingly formed over the support substrate by a vapor deposition process. The deposition processes such as various chemical vapor deposition processes are known to provide a controlled environment to produce highly pure material layers and may be used to minimize or eliminate various contaminations such as OH contents and other light scattering or absorbing contents. The operating part of the WGM resonator is the deposited layer of the optical material (which is sufficiently thick to spatially encompass the WG modes) and the support substrate supports the deposited layer in the desired shape and may further provide a mounting mechanisms for holding the WGM resonator in position. In this design, the high purity of the optical material and the consistency and uniformity of the layers for different WGM resonators are achieved through the vapor deposition process. Notably, impurities with the OH content may be substantially eliminated by properly control the vapor deposition process. The support substrate can be shaped by a separate process with a high precision such as precision machining of a machinable material like a metal. The substrate may be machined by using a diamond turning process to achieve a surface roughness on the order of one angstrom. The vapor deposition further ensures that the deposited layer conforms to the exterior of the support substrate and thus is in the desired geometry defined by the support substrate.

The above resonator design and fabrication by a vapor deposition may be used to form WGM resonators in different configurations. The following sections describe exemplary resonator configurations suitable for the above implementations. Each of these exemplary resonator configurations may be used to form the support substrate and then the deposited optical material on the substrate is used to form the WGM resonator.

Figure 2:
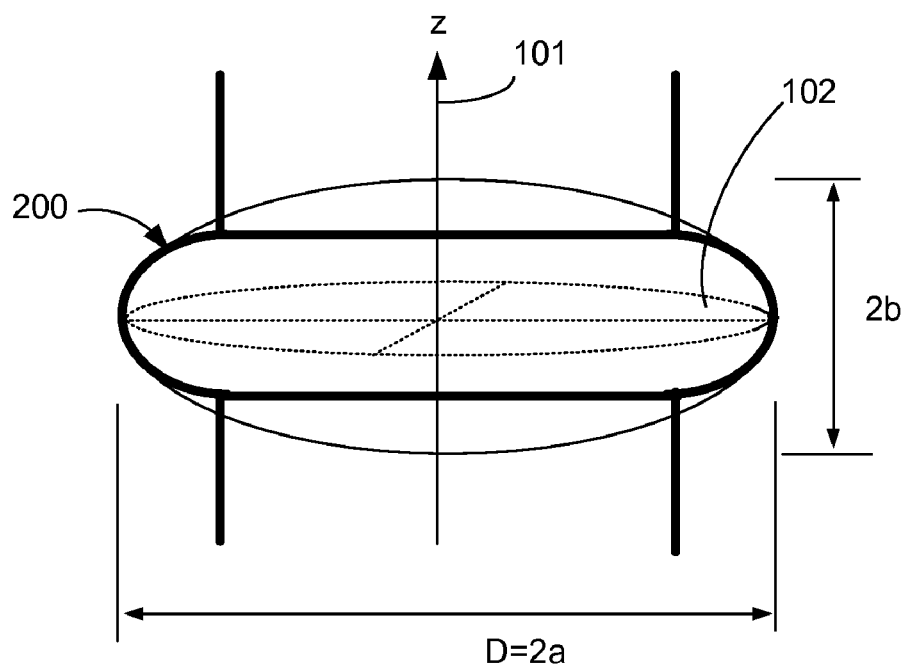
Figure 3:
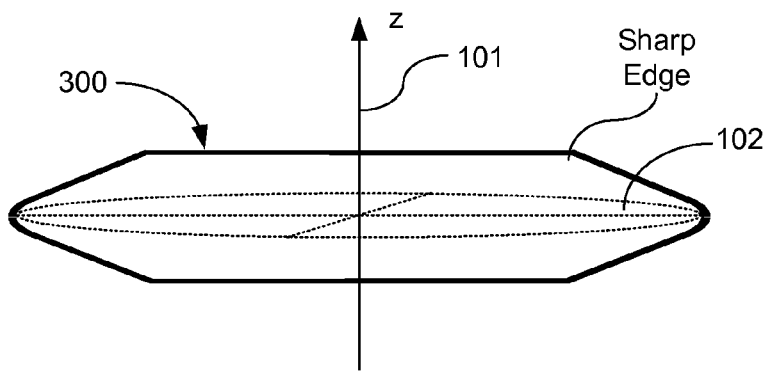

FIGS. 1, 2, and 3 illustrate three exemplary geometries for WGM resonators. FIG. 1 shows a spherical WGM resonator 100 which is a solid dielectric sphere. The sphere 100 has an equator in the plane 102 which is symmetric around the z axis 101. A WG mode exists around the equator within the spherical exterior surface and circulates within the resonator 100. The spherical curvature of the exterior surface around the equator plane 102 provides spatial confinement along both the z direction and its perpendicular direction to support the WG modes. The eccentricity of the sphere 100 generally is low.

FIG. 2 shows an exemplary spheriodal microresonator 200. This resonator 200 may be formed by revolving an ellipse (with axial lengths a and b) around the symmetric axis along the short elliptical axis 101 (z). The eccentricity of resonator 100 is $(1-b^2/a^2)^{1/2}$ and is generally high, e.g., greater than $10^{-1}$. Hence, the exterior surface is the resonator 200 is not part of a sphere and provides more spatial confinement on the modes along the z direction than a spherical exterior. The equator plane 102 at the center of the resonator 200 is perpendicular to the axis 101 (z) and the WG modes circulate near the circumference of the plane 102 within the resonator 200.

FIG. 3 shows another exemplary WGM resonator 300 which has a non-spherical exterior where the exterior profile is a general conic shape which can be mathematically represented by a quadratic equation of the Cartesian coordinates. Similar to the geometries in FIGS. 1 and 2, the exterior surface provides curvatures in both the direction in the plane 102 and the direction of z perpendicular to the plane 102 to confine and support the WG modes. Such a non-spherical, non-elliptical surface may be, among others, a parabola or hyperbola.

The above three exemplary geometries in FIGS. 1, 2, and 3 share a common geometrical feature that they are all axially or cylindrically symmetric around the axis 101 (z) around which the WG modes circulate in the plane 102. The curved exterior surface is smooth around the plane 102 and provides two-dimensional confinement around the plane 102 to support the WG modes.

Notably, the spatial extent of the WG modes in each resonator along the z direction 101 is limited above and below the plane 102 and hence it may not be necessary to have the entirety of the sphere 100, the spheroid 200, or the conical shape 300. Instead, only a portion of the entire shape around the plane 102 that is sufficiently large to support the whispering gallery modes may be used to for the WGM resonator. For example, rings, disks and other geometries formed from a proper section of a sphere may be used as a spherical WGM resonator.

Figure 4A:
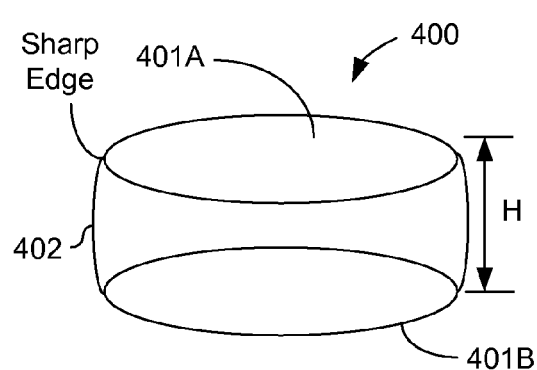
Figure 4B:
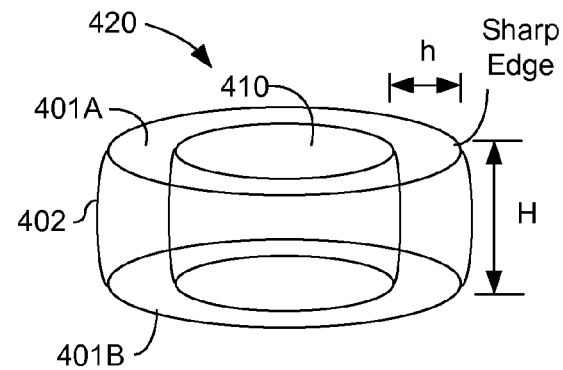

FIGS. 4A and 4B show a disk-shaped WGM resonator 400 and a ring-shaped WGM resonator 420, respectively. In FIG. 4A, the solid disk 400 has a top surface 401A above the center plane 102 and a bottom surface 401B below the plane 102 with a distance H. The value of the distance H is sufficiently large to support the WG modes. Beyond this sufficient distance above the center plane 102, the resonator may have sharp edges as illustrated in FIGS. 3, 4A, and 4B. The exterior curved surface 402 can be selected from any of the shapes shown in FIGS. 1, 2, and 3 to achieve desired WG modes and spectral properties. The ring resonator 420 in FIG. 4B may be formed by removing a center portion 410 from the solid disk 400 in FIG. 4A. Since the WG modes are present near the exterior part of the ring 420 near the exterior surface 402, the thickness h of the ring may be set to be sufficiently large to support the WG modes.

In fabricating the above and other WGM resonators with high material purity, a vapor deposition process may be used to deposit a glass material onto a prefabricated substrate. The substrate is preferably made from a material the thermal expansion properties of which well match those of the deposited glass. For example, the commercial Kovar alloy may be used for the substrate and the silica is used for the glass material. Suitable tools prior to deposition may be used to shape the substrate. The shape of the deposited glass material essentially reproduces the shape of the substrate by being conformingly deposited. This method allows separating the tasks of achieving the desired resonator shape and preserving the pristine quality of the resonator material. The shape of the resonator is determined by the quality of perform matching, which may be in the angstrom roughness level if diamond turning on non-glass substrates is utilized. The vapor deposition process and its variations leading to the OH-free glass provide the desired glass material quality.

Figure 5:
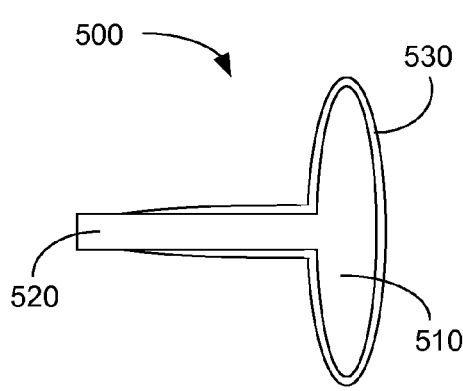
FIGS. 5 and 6 show cross sectional views of a disk-shaped and a spherical WGM resonators based on deposition of an optical material over a support substrate.
Figure 6:
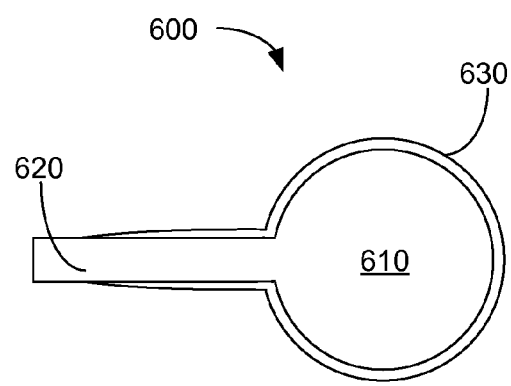

FIGS. 5 and 6 two examples of WGM resonators each having a support substrate and a layer of a deposited optical material. FIG. 5 shows a substrate having a disk-like portion 510 that defines a WGM resonator and a stem 520 for holding and supporting the disk-like portion 510. The substrate may be a metal and is machined with high precision to form the shape and exterior surfaces. A layer 530 of an optical material such as $SiO_2$ is conformingly deposited on the substrate to take on the shape of the substrate. The part of the layer 530 on the disk-like portion forms the WGM resonator and is sufficiently thick to support WGM modes. FIG. 6 shows a spherical WGM resonator 600 with a substrate having a spherical portion 610 and a stem 620 and a deposited optical material layer 630.

In the above WGM resonators, the deposited optical layer for supporting WG modes is directly exposed to the surrounding environment and thus may be subject to contamination, physical damages to the resonator surface, and other adverse effects due to the direct exposure. The WGM resonators shown in FIGS. 7, 8A and 8B are designed to cover the optical layer for supporting WGM modes with an outer layer and thus avoid the direct exposure of the WGM resonator.

Figure 7:
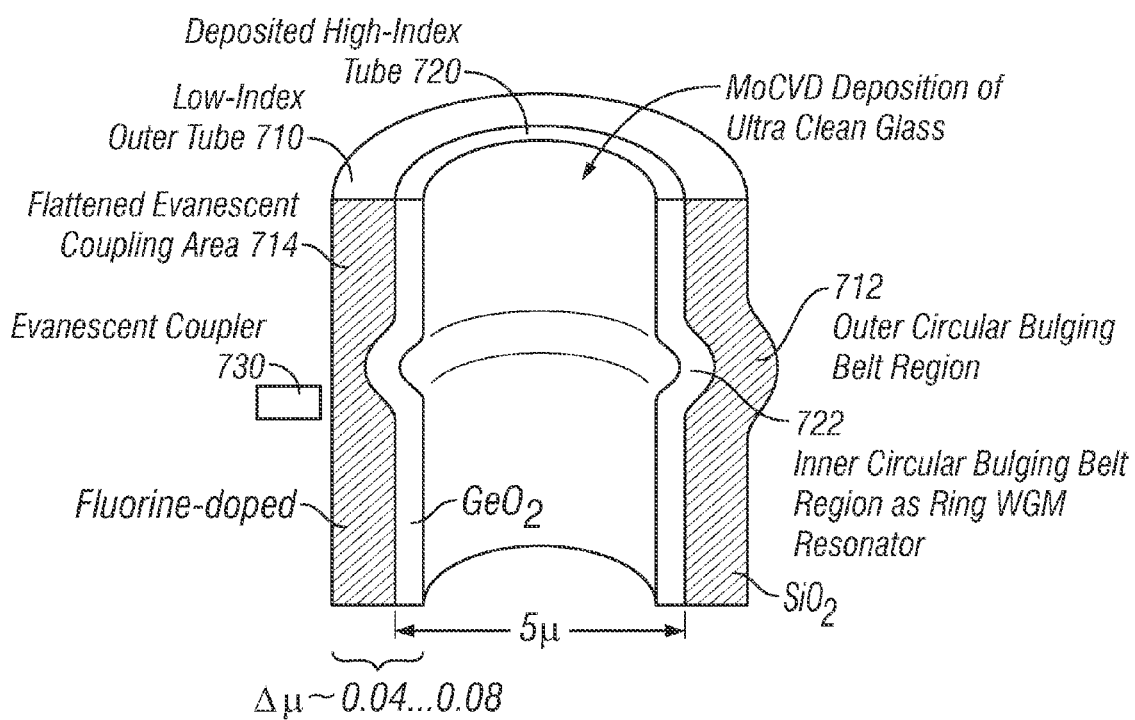
FIG. 7 shows another exemplary design of a WGM resonator based on a deposition process.
Figure 8A:
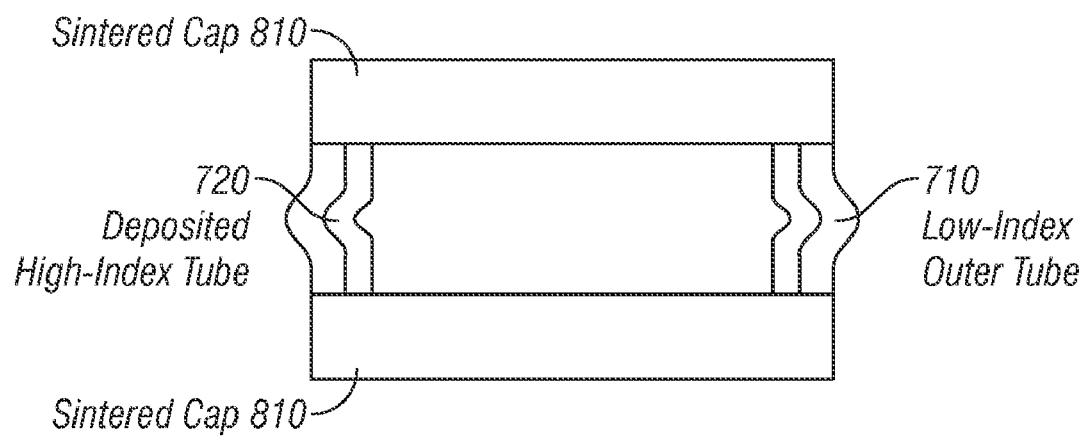
FIGS. 8A and 8B show two configurations for sealing the WGM resonator shown in FIG. 7.
Figure 8B:
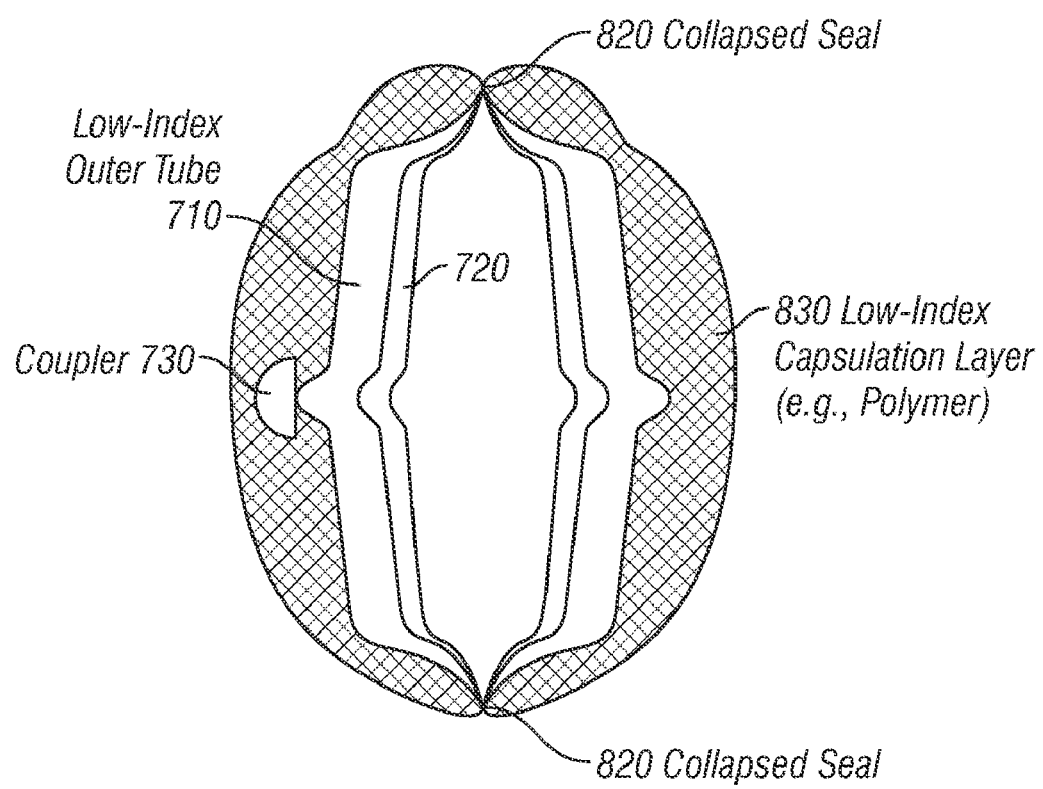

FIG. 7 shows a WGM resonator with an inner high-index optical tube 720 and an outer low-index tube 710 that are conformingly engaged to each other. As an example, the inner tube 720 may be formed from Ge doped silica with a high index (e.g., about 1.48) and the outer tube 710 may be formed from fluorine doped silica with a relatively low index (e.g., about 1.41). The tubes 710 and 720 have coinciding bulging belt regions 712 and 722, respectively, to form a ring WGM resonator in the inner circular bulging belt region 712. The exterior surface of the WGM resonator is the outer surface of the bulging belt region 722 and is covered and protected by the outer tube 712. As illustrated, the outer tube 710 may be much thicker than one optical wavelength of the WG modes and thus the entirety of each WG mode is essentially confined within the outer tube 710.

An area 714 of the bulging belt region 712 of the outer tube 710 may be thinned by shaving or polishing to form an optical surface that is within the reach of the evanescent fields of the WG modes. An evanescent optical coupler 730 may be positioned at the flattened area 714 to couple light into or extract light out of the WGM resonator formed by the inner bulging belt region 722. The coupler 730 may be implemented in various configurations, such as angle-polished fiber tips, angle-polished waveguides, photonic bandgap materials, and GRIN lenses or prisms. Although only one coupler is illustrated, an input coupler and an output coupler may be implemented.

The WGM resonator in FIG. 7 may be fabricated with a vapor deposition process as follows. First, the low index outer tube 710 (e.g., silica or F-doped silica) is provided. Next, the circular bulging belt region 712 is formed at a selected location of the outer tube 710. When a silica fiber perform tube is used as the outer tube 710, this selected location may be heated to cause the bulging belt region 712. Next, a vapor deposition process, such as the Metal-Organic Chemical Vapor Deposition (MOCVD) is performed to deposit on the inner wall of the outer tube highly pure high-index optical material with matched or closed matched material properties such as thermal expansion coefficients to form the inner high-index tube 720. The deposited layer nearly perfectly conforms to the inner surface profile of the outer tube 710 and thus also forms the inner circular bulging belt region 722 that conforms to the outer circular bulging belt region 712. The thickness of the deposited layer is controlled to be sufficient for supporting WG modes.

The WGM resonator in FIG. 7 has two openings and thus still exposes the inner tube 720 to various contamination from the environment. FIGS. 8A and 8B illustrate two exemplary sealing methods to completely isolate the entire WGM resonator in FIG. 7 from the environment.

FIG. 8A shows that two end caps 810 may be engaged to the two openings of the inner and outer tubes 720 and 710. FIG. 8B further shows that the two openings may be collapsed to seal off the WGM resonator by, e.g., heating the end openings. After collapsing and sealing of the two end openings. One or two evanescent optical couplers 720 may be positioned to flattened areas as shown in FIG. 7. Next, a capsulation layer 830 with a refractive index less than that of the outer tube 710 (e.g., a polymer with an index of about 1.37) may be formed over the entire exterior of the sealed tube 710 and the optical coupler 730.

Figure 9:
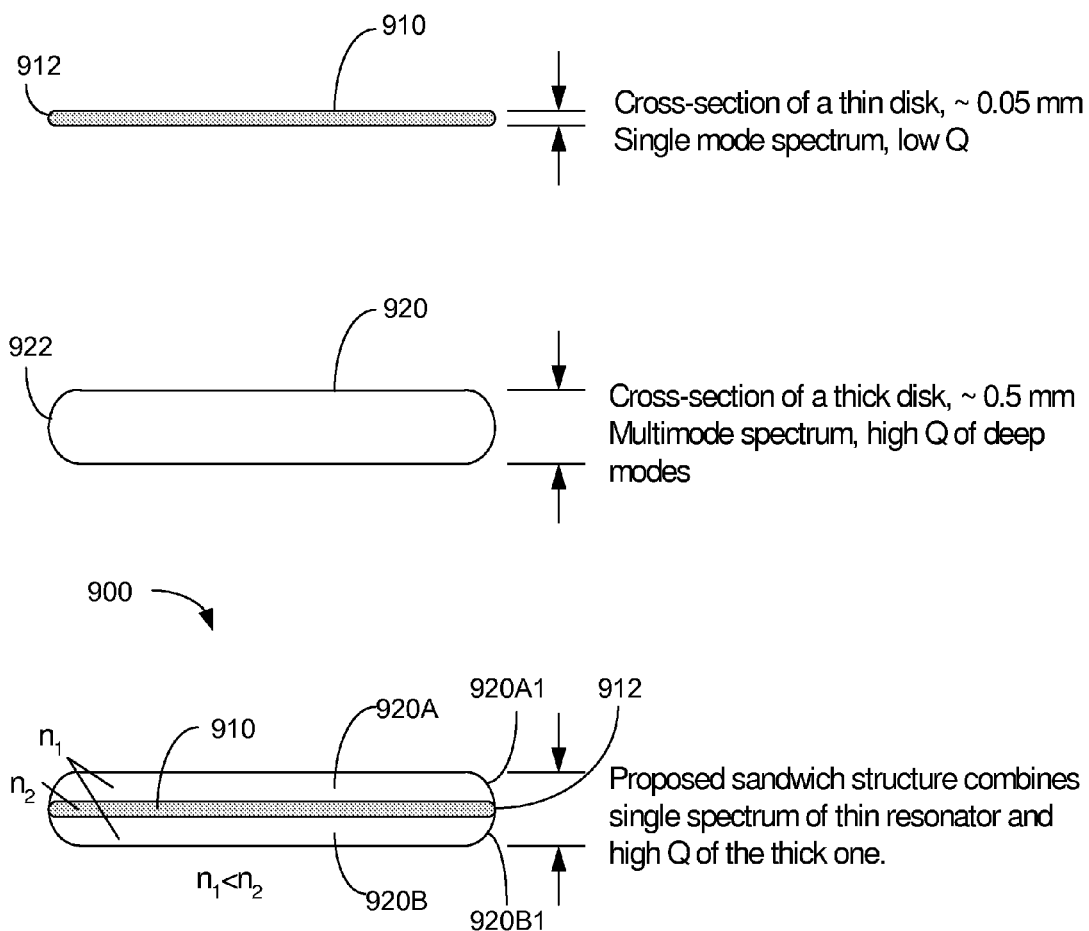
FIG. 9 shows an example of a composite WGM resonator.

This application further describes WGM resonators with composite structures. FIG. 9 shows an example of a composite WGM disk resonator 900 with three different optical layers 910, 920A, and 920B. The center layer 910 is essentially a thin disk WGM resonator with curved side surfaces 912 for supporting WGM modes. The two layers 920A and 920B are respectively located on two sides of the center layer 910 in a sandwich geometry. The top and bottom layers 920A and 920B are thicker than the center layer 910 to provide a high Q factor and have a refractive index lower than that of the center layer 910. The side curved surface 920A1 for the upper layer 920A, the side curved surface 912 of the center layer 910, and the side curved surface 920B1 form a continuous side curved surface and spatially confine and support the WGM modes circulating around the perimeter or circumference of the center layer 910. This composite WGM resonator 900 uses the thin center layer 920 to provide a single mode spectrum and the thick top and bottom layers 920A and 920B to achieve a high Q factor.

Experiments demonstrated that a single mode spectrum can be achieved in fused silica toroidal resonators with thickness of about 50 microns. The top diagram in FIG. 9 shows the center layer 910 standing alone as a thin disk resonator. The drawback of this geometry is that the quality factor, Q, is limited by the scattering on the flat surfaces of the thin disk, e.g., to about $2 \times 10^8$ for resonators of this geometry fabricated from ultra pure low OH fused silica. On the other hand, experiments also demonstrated that if a resonator from same material is made thicker, e.g., about 500 microns, the Q factor can be increased at least one order of magnitude. This increase is in part due to minimized alteration of material (mechanical and thermal) for such geometry, and also to accessibility of deeper WG modes which experiences significant less scattering on the flat surfaces of the disk. FIG. 9 shows this thick WGM resonator in the middle diagram. However, the penalty of this thick disk geometry is a dense spectrum with multiple modes. Such a complex spectrum may present a problem for applications when a single mode spectrum with resonant feature spaced at full free spectral range (FSR) is desired. An example of such applications is a coupled opto-electronic oscillator (COEO).

The composite WGM resonator 900 in FIG. 9 combine the attractive features of both thin and thick disks by using a sandwich structure with the think center layer 910 that supports the single mode operation and a thicker cladding layer of a lower index material above and below the central layer 910 to insure the protection and accessibility of deep WG modes. Such layered structures can be fabricated using, for example, processes similar to those used for fabrication of fiber optic preforms.

FIG. 10 shows an exemplary fabrication method for making a layered structure suitable for making the composite WGM resonator 900 in FIG. 9. A preform tube 1012 is fabricated by, e.g., standard fiber preform fabrication techniques. A layer of high purity doped material is deposited inside the high purity fused silica tube 1012 to form the inside layer 1014. The inside layer 1014 has higher refractive index then that of the outside tube 1012, similar to fabrication of silica fibers. The layer thickness and index of refraction are the design parameters and may be selected according to the design requirements. Next, the filled tube is collapsed with pressure applied from two opposing direction to form a flat piece with eventual elimination of hollow center channel. The flat piece is then rolled into a sheet of a desired thickness. Round blanks can be fabricated from such a sheet. A round blank may be used to form the composite WGM resonator 900 in FIG. 9.

Only a few implementations are disclosed. However, it is understood that variations and enhancements may be made.

What is claimed is:

1. A device, comprising:
   a substrate material shaped to include curved surfaces to define a shape of an optical resonator which supports at least one whispering gallery mode; and
   a layer of a glass material conformingly deposited on the substrate material by a vapor deposition process to conformingly cover the curved surfaces of the substrate material to form the resonator.

2. A device as in claim 1, wherein the glass material is a OH-free glass.

3. A device as in claim 1, wherein the glass material is SiO2.

4. A device as in claim 1, wherein the glass material and the substrate material have matching coefficients of thermal expansion.

5. A device as in claim 1, wherein the substrate material is a metal.

6. A device as in claim 5, wherein the metal is an alloy.

7. A device as in claim 6, wherein the metal is a Kovar alloy.

8. A device as in claim 5, wherein the substrate material is shaped to have a surface roughness at the angstrom level.

9. A device as in claim 5, wherein the substrate material is shaped by a diamond turning method.

10. A device as in claim 1, wherein the substrate material is shaped by a diamond turning method.

11. A device as in claim 1, wherein the substrate material is a non-glass material.

12. A device as in claim 1, wherein the substrate material is a machinable material.

13. A device as in claim 1, wherein the substrate material is shaped to comprise a stem and a disk connected to one end of the stem.

14. A device as in claim 1, wherein the substrate material is shaped to comprise a disk.

15. A device as in claim 1, wherein the substrate material has a shape other than a disk.

16. A device as in claim 1, wherein the substrate material is shaped to comprise a whole sphere.

17. A device as in claim 1, wherein the substrate material is shaped to comprise a portion of a whole sphere.

18. A device as in claim 1, wherein the substrate material is shaped to comprise a non-spherical shape.

19. A device as in claim 1, wherein the substrate material is shaped to comprise a spheriodal shape.

20. The device as in claim 1, wherein the substrate material is shaped to comprise a ring shape.

* * * * *

UNITED STATES PATENT AND TRADEMARK OFFICE
CERTIFICATE OF CORRECTION

PATENT NO. : 7,400,796 B1
APPLICATION NO. : 10/887338
DATED : July 15, 2008
INVENTOR(S) : Dmitri A. Kossakovski It is certified that error appears in the above-identified patent and that said Letters Patent is hereby corrected as shown below:

Column 7, line 36, (Claim 3) delete "SiO2" and insert --$SiO_2$--;

Column 8, line 32, (Claim 19) delete "spheriodal" and insert --spheroidal--.

Signed and Sealed this

Twenty-first Day of October, 2008

JON W. DUDAS
*Director of the United States Patent and Trademark Office*